(12) United States Patent
Wang et al.

(10) Patent No.: US 11,653,350 B2
(45) Date of Patent: May 16, 2023

(54) VARIABLE UPLINK RESPONSE AND/OR SCHEDULING DELAYS FOR NON-TERRESTRIAL NETWORKS

(71) Applicant: QUALCOMM Incorporated, San Diego, CA (US)

(72) Inventors: Xiao Feng Wang, San Diego, CA (US); Iyab Issam Sakhnini, San Diego, CA (US); Peter Gaal, San Diego, CA (US); Jun Ma, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 16/863,650

(22) Filed: Apr. 30, 2020

(65) Prior Publication Data

US 2020/0351918 A1  Nov. 5, 2020

Related U.S. Application Data

(60) Provisional application No. 62/842,994, filed on May 3, 2019.

(51) Int. Cl.
*H04W 72/12* (2009.01)
*H04W 72/1268* (2023.01)
*H04W 74/08* (2009.01)
*H04W 72/0446* (2023.01)
*H04W 72/044* (2023.01)

(52) U.S. Cl.
CPC ..... *H04W 72/1268* (2013.01); *H04W 72/046* (2013.01); *H04W 72/0446* (2013.01); *H04W 74/0833* (2013.01)

(58) Field of Classification Search
CPC .......... H04W 72/1268; H04W 72/042; H04W 72/046; H04L 47/283; H04L 47/56
See application file for complete search history.

(56) References Cited

U.S. PATENT DOCUMENTS

| 2010/0008458 A1* | 1/2010 | Jiang | H04W 56/0065 375/371 |
|---|---|---|---|
| 2015/0181544 A1* | 6/2015 | Liu | H04B 7/18506 370/336 |
| 2016/0227505 A1* | 8/2016 | Loehr | H04W 72/0413 |
| 2016/0227575 A1* | 8/2016 | Furuskog | H04W 72/1268 |

(Continued)

OTHER PUBLICATIONS

International Search Report and Written Opinion—PCT/US2020/030976—ISA/EPO—dated Sep. 14, 2020.

(Continued)

*Primary Examiner* — Jael M Ulysse
(74) *Attorney, Agent, or Firm* — Harrity & Harrity, LLP

(57) ABSTRACT

Various aspects of the present disclosure generally relate to wireless communication. In some aspects, a base station (BS) may determine at least one of a variable random access response (RAR) window start time, a variable maximum quantity of slots for an index of a first slot of a physical random access channel occasion, or scheduling information related to one or more variable delays for an uplink transmission. The BS may transmit, to a user equipment, at least one of information that identifies the RAR window start time, information that identifies the variable maximum quantity of slots, or the scheduling information. Numerous other aspects are provided.

44 Claims, 8 Drawing Sheets

(56) References Cited

U.S. PATENT DOCUMENTS

| | | | | |
|---|---|---|---|---|
| 2017/0367120 | A1* | 12/2017 | Murray | H04B 7/0695 |
| 2018/0062811 | A1* | 3/2018 | Akkarakaran | H04B 7/0617 |
| 2018/0102817 | A1* | 4/2018 | Park | H04B 7/06 |
| 2019/0165894 | A1* | 5/2019 | Choi | H04B 17/24 |
| 2019/0239214 | A1* | 8/2019 | Yang | H04L 1/1861 |
| 2019/0254013 | A1* | 8/2019 | Chang | H04L 5/00 |
| 2020/0059951 | A1* | 2/2020 | Frenne | H04W 72/1289 |
| 2020/0068509 | A1* | 2/2020 | Ahn | H04W 52/243 |
| 2020/0169375 | A1* | 5/2020 | Yl | H04L 5/0064 |
| 2020/0236524 | A1* | 7/2020 | Ye | H04W 72/0446 |
| 2020/0245361 | A1* | 7/2020 | Xiong | H04W 74/008 |
| 2021/0126753 | A1* | 4/2021 | Mochizuki | H04W 72/085 |

OTHER PUBLICATIONS

Panasonic: "Issues on Timing Advance and RACH for NTN", 3GPP Draft, R1-1906264, NTN RACH, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 1, 2019 (May 1, 2019), XP051708302, 4 Pages, Retrieved from the Internet: URL: http://www.3gpp.org/ftp/tsg%5Fran/WG1%5FRL1/TSGR1%5F97/Docs/R1%2D1906264%2Ezip. [retrived on May 1, 2019], p. 1, Line 1, paragraph 2—line 2 p. 2. line 3—line 4 p. 1. line 11. paragraph 2—line 14.

Qualcomm Incorporated: "RACH Procedure and UL Timing Control for NTN", 3GPP Draft, R1-1905016, RACH Procedure and UL Timing Control for NTN, 3rd Generation Partnership Project (3GPP), Mobile Competence Centre, 650, Route Des Lucioles, F-06921 Sophia-Antipolis Cedex, France, vol. RAN WG1, No. China, Apr. 8, 2019-Apr. 12, 2019, Apr. 7, 2019 (Apr. 7, 2019), XP0151700131, 5 pages, Retrieved from Internet: URL: http://www.3gpp.org/ftp/Meetings%5F3GPP%5FSYNC/RAN1/Docs/R1%2D1905016%2Ezip. [retr ~ • 019-04-07] page ragraph 2—p. 2 2nd 'u t; p.

ZTE Corporation et al., "Remaining Issue on RACH for NTN", 3GPP Draft, R2-1906114, Remaining Issue on RACH for NTN, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 2, 2019 (May 2, 2019), XP051710441, 6 pages, Retrieved from the Internet: URL: http://www.3gpp.org/ftp/tsg%5Fran/WG2%5FRL2/TSGR2%5F106/Docs/R2%2D1906114%2Ezi p. [retrieved on May 2, 2019] p. 1. line 4. paragraph 2.1—line 5 ll Proposal 111; p. 2 p. 2. line 18—p. 3. line 2 ll Proposal 311; p. 3.

* cited by examiner

VARIABLE UPLINK RESPONSE AND/OR SCHEDULING DELAYS FOR NON-TERRESTRIAL NETWORKS

CROSS-REFERENCE TO RELATED APPLICATION

This Patent Application claims priority to U.S. Provisional Patent Application No. 62/842,994, filed on May 3, 2019, entitled "VARIABLE UPLINK RESPONSE AND/OR SCHEDULING DELAYS FOR NON-TERRESTRIAL NETWORKS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for variable uplink response and/or scheduling delays for non-terrestrial networks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), information indicating scheduling information related to one or more variable delays for an uplink transmission, wherein the scheduling information identifies a common scheduling delay of the one or more variable delays; and communicating with the BS in accordance with the scheduling information.

In some aspects, a user equipment for wireless communication may include a memory and one or more processors operatively coupled to the memory. The memory and the one or more processors may be configured to receive, from a BS, information indicating scheduling information related to one or more variable delays for an uplink transmission, wherein the scheduling information identifies a common scheduling delay of the one or more variable delays; and communicate with the BS in accordance with the scheduling information.

In some aspects, a non-transitory computer-readable medium may store one or more instructions for wireless communication. The one or more instructions, when executed by one or more processors of a UE, may cause the one or more processors to: receive, from a BS, information indicating scheduling information related to one or more variable delays for an uplink transmission, wherein the scheduling information identifies a common scheduling delay of the one or more variable delays; and communicate with the BS in accordance with the scheduling information.

In some aspects, an apparatus for wireless communication may include means for receiving, from a BS, information indicating scheduling information related to one or more variable delays for an uplink transmission, wherein the scheduling information identifies a common scheduling delay of the one or more variable delays; and means for communicating with the BS in accordance with the scheduling information.

In some aspects, a method of wireless communication, performed by a user equipment (UE), may include receiving information that identifies a variable random access response (RAR) window start time; and performing a random access procedure in accordance with the information that identifies the variable RAR window start time, wherein the variable RAR window start time identifies an earliest time at which a RAR can be transmitted to the UE.

In some aspects, a user equipment for wireless communication may include a memory and one or more processors operatively coupled to the memory. The memory and the one or more processors may be configured to receive information that identifies a variable random access response (RAR) window start time; and perform a random access procedure in accordance with the information that identifies the variable RAR window start time, wherein the variable RAR window start time identifies an earliest time at which a RAR can be transmitted to the UE.

In some aspects, a non-transitory computer-readable medium may store one or more instructions for wireless communication. The one or more instructions, when executed by one or more processors of a UE, may cause the one or more processors to: receive information that identifies a variable random access response (RAR) window start time; and perform a random access procedure in accordance with the information that identifies the variable RAR window start time, wherein the variable RAR window start time identifies an earliest time at which a RAR can be transmitted to the UE.

In some aspects, an apparatus for wireless communication may include means for receiving information that identifies a variable random access response (RAR) window start time; and means for performing a random access procedure in accordance with the information that identifies the variable RAR window start time, wherein the variable RAR window start time identifies an earliest time at which a RAR can be transmitted to the UE.

In some aspects, a method of wireless communication, performed by a BS, may include determining at least one of: a variable random access response (RAR) window start time, a variable maximum quantity of slots for an index of a first slot of a physical random access channel (PRACH) occasion, or scheduling information related to one or more variable delays for an uplink transmission; and transmitting, to a UE, at least one of: information that identifies the RAR window start time, information that identifies the variable maximum quantity of slots, or the scheduling information.

In some aspects, a BS for wireless communication may include memory and one or more processors operatively coupled to the memory. The memory and the one or more processors may be configured to determine at least one of: a variable RAR window start time, a variable maximum quantity of slots for an index of a first slot of a PRACH occasion, or schedule information related to one or more variable delays for an uplink transmission; and transmit, to a UE, at least one of: information that identifies the RAR window start time, information that identifies the variable maximum quantity of slots, or the scheduling information.

In some aspects, a non-transitory computer-readable medium may store one or more instructions for wireless communication. The one or more instructions, when executed by one or more processors of a BS, may cause the one or more processors to: determine at least one of: a variable RAR window start time, a variable maximum quantity of slots for an index of a first slot of a PRACH occasion, or schedule information related to one or more variable delays for an uplink transmission; and transmit, to a UE, at least one of: information that identifies the RAR window start time, information that identifies the variable maximum quantity of slots, or the scheduling information.

In some aspects, an apparatus for wireless communication may include means for determining at least one of: a variable RAR window start time, a variable maximum quantity of slots for an index of a first slot of a PRACH occasion, or means for scheduling information related to one or more variable delays for an uplink transmission; and means for transmitting, to a UE, at least one of: information that identifies the RAR window start time, information that identifies the variable maximum quantity of slots, or the scheduling information.

Aspects generally include a method, apparatus, system, computer program product, non-transitory computer-readable medium, user equipment, base station, wireless communication device, and processing system as substantially described herein with reference to and as illustrated by the accompanying drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
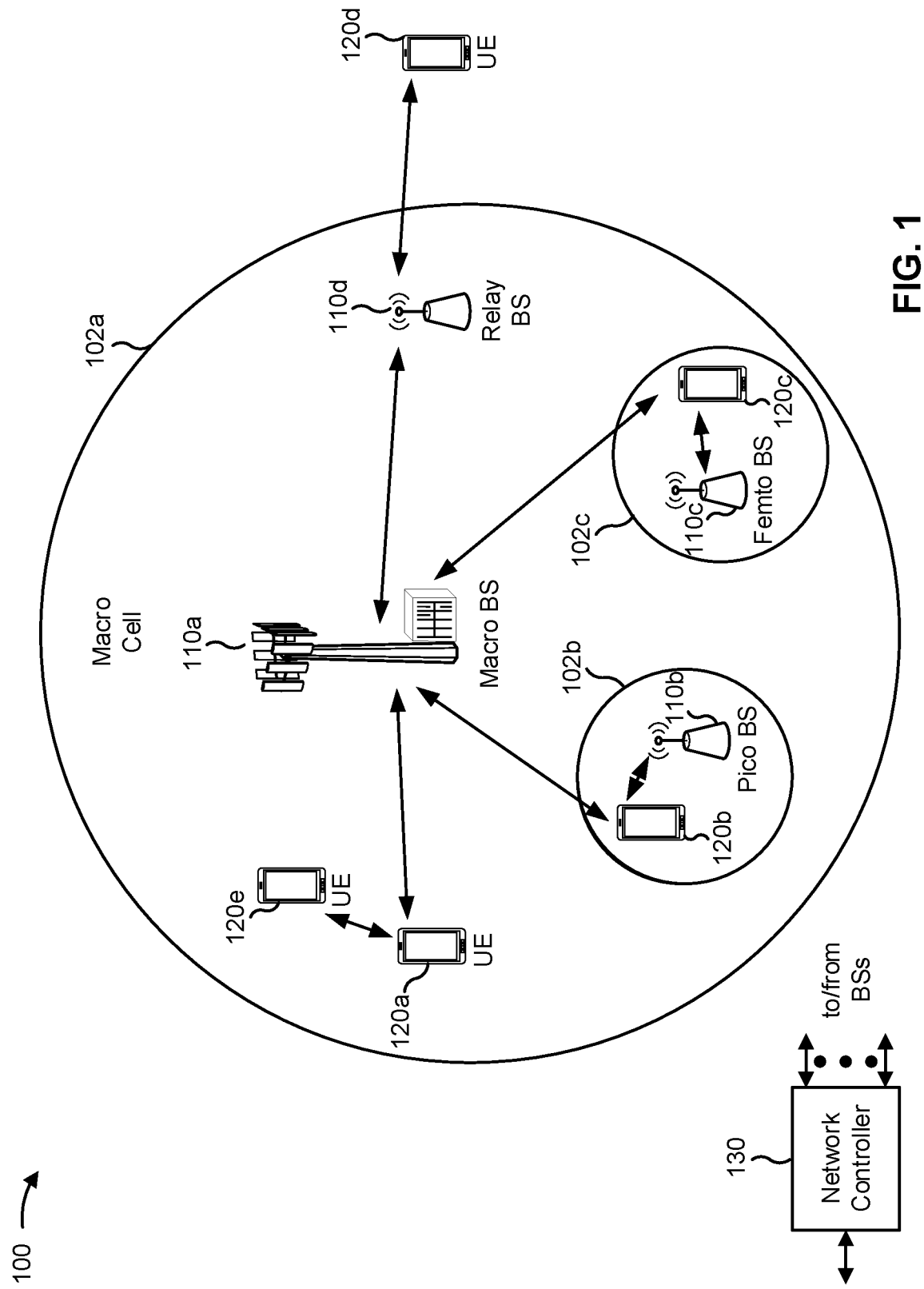
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
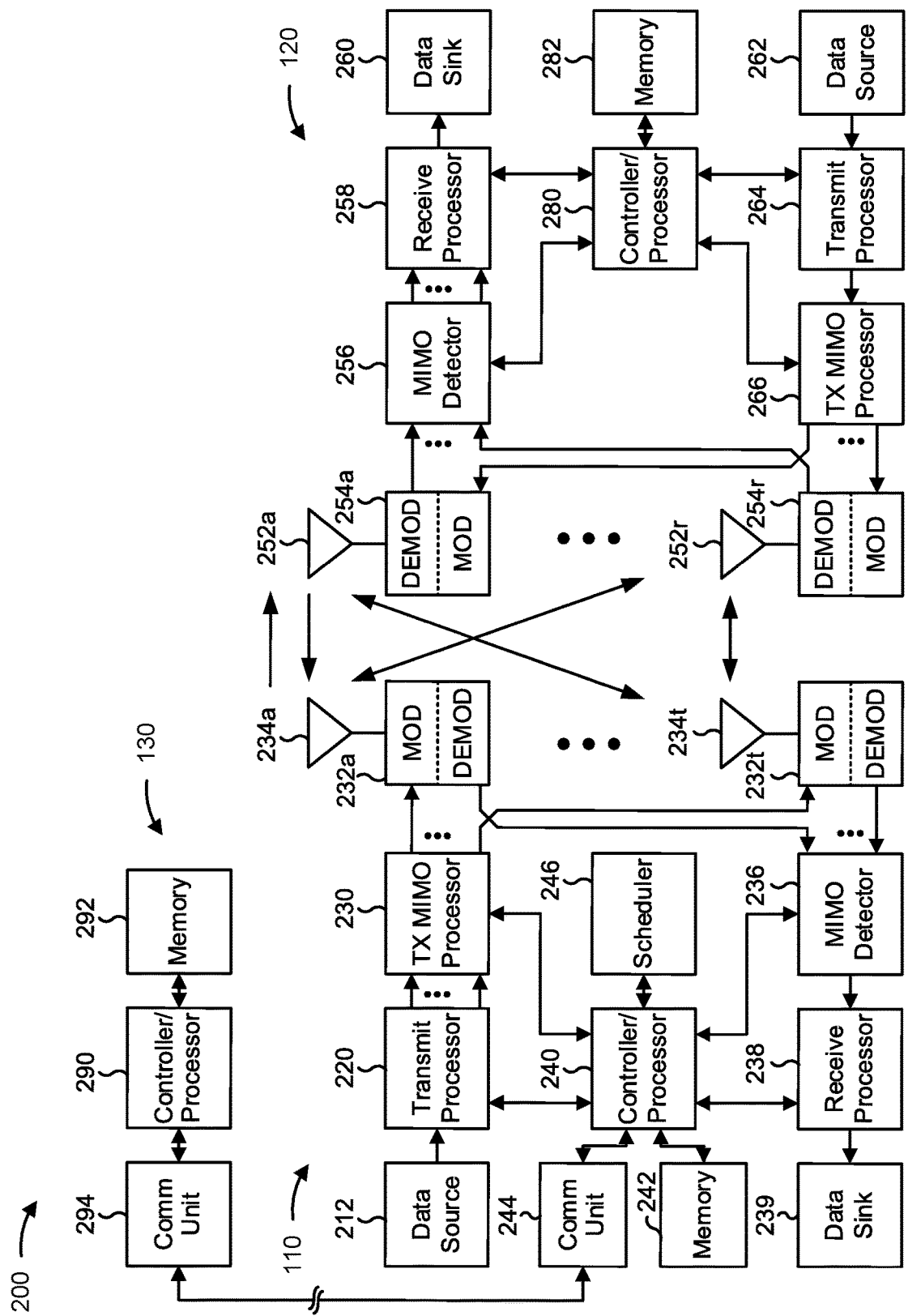
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with variable uplink response and/or scheduling delays for non-terrestrial networks, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, base station 110 may include means for determining at least one of a variable random access response (RAR) window start time, a maximum quantity of slots for an index of a first slot of a physical random access channel (PRACH) occasion, or scheduling information related to one or more variable delays for an uplink transmission; means for transmitting, to a UE, at least one of information that identifies the RAR window start time, information that identifies the maximum quantity of slots, or the scheduling information; and/or the like. In some aspects, such means may include one or more components of base station 110 described in connection with FIG. 2.

In some aspects, UE 120 may include means for receiving, from a BS, information indicating scheduling information related to one or more variable delays for an uplink transmission, wherein the scheduling information identifies a common scheduling delay of the one or more variable delays; means for communicating with the BS in accordance with the scheduling information; means for receiving information that identifies a variable RAR window start time; means for performing, prior to communicating with the BS in accordance with the scheduling information, a random access procedure in accordance with the information that identifies the variable RAR window start time; means for receiving information that identifies a variable maximum quantity of slots for an index of a first slot of a PRACH occasion; means for performing, prior to communicating with the BS in accordance with the scheduling information, a random access procedure in accordance with the variable maximum quantity of slots for the index of the first slot of the PRACH occasion; and/or the like. In some aspects, such means may include one or more components of UE 120 described in connection with FIG. 2.

As indicated above, FIG. 2 is provided as an example. Other examples may differ from what is described with regard to FIG. 2.

Space and/or airborne vehicles (e.g., satellites, balloons, airships, and/or the like) are less vulnerable to natural disasters and physical attacks and can provide wider service coverage when operating as non-terrestrial BSs, compared to terrestrial BSs. For example, a satellite may be a transparent satellite (e.g., where the satellite acts as a repeater and a BS is at a gateway) or a regenerative satellite (e.g., where a satellite acts as a BS). These types of BSs use a random access response (RAR) window start time, a random access radio network temporary identifier (RA-RNTI), and various scheduling delays. Due to the long distance between UEs and these non-terrestrial BSs, non-terrestrial networks can experience significantly larger delays compared to terrestrial networks.

To account for common delays experienced in a beam, non-terrestrial BSs may signal a delay at the beam center to a UE prior to initial access. For initial access, all UEs in a beam may adjust their timing (for the physical random access channel (PRACH) preamble) in accordance with the beam center signaled values. However, the UEs may each still have a residual timing offset that depends on each UE's location within a beam (e.g., differential delay). In addition, for a given deployment, a feeder link delay (e.g., gateway to satellite) may be variable in time and different for each non-terrestrial BS (e.g., satellite), and a service link delay (e.g., satellite to UE) may be variable in time and different for each beam and/or UE.

An RAR message (e.g., message 2 in a random access channel (RACH) procedure) is a downlink message in response to the PRACH preamble. After sending the PRACH preamble, a UE searches for the RAR message addressed to the UE, starting from a pre-determined RAR window start time until an RAR window size elapses (a BS signals the RAR window size to the UE). The RAR window start time is defined as the time between a last symbol (or slot) of a PRACH occasion and a starting symbol (or slot) of an RAR window. In NR, the RAR window start time is fixed. In a non-terrestrial network, having a fixed RAR window start time may not be ideal due to variable (and/or large) feeder link delay, variable (and/or large) service link delay, and/or whether the BS is operating as a transparent satellite or a regenerative satellite.

In NR, RA-RNTI is used by a UE to determine whether an RAR message that the UE attempts to decode is associated with a PRACH preamble that the UE sent to a BS. The UE calculates the RA-RNTI based at least in part on preamble parameters, and a BS performs similar calculations based at least in part on a received PRACH preamble. A BS may scramble a cyclic redundancy check (CRC) of an RAR message using a calculated RA-RNTI, and the UE determines whether the RAR message is the correct RAR message based at least in part on the CRC scrambled with the RA-RNTI. To determine an RA-RNTI, the following expression is used:

$$1 + s_{id} + 14 * t_{id} + 14 * 80 * f_{id} + 14 * 80 * 8 * ul_{carrierid}$$

where $s_{id}$ is an index of a first OFDM symbol of a PRACH occasion ($0 \leq s_{id} < 14$), where $t_{id}$ is an index of a first slot of a PRACH occasion in a system frame ($0 \leq t_{id} < 80$), where $f_{id}$ is an index of a PRACH occasion in a frequency domain ($0 \leq f_{id} < 8$), and where $ul_{carrierid}$ is an uplink carrier used for random access preamble transmission ($ul_{carrierid}$ can have a value of 0 or 1).

As described above, NR has the $t_{id}$ within a system frame, and periodicity and density of a PRACH occasion in time aligns with this system frame. In non-terrestrial networks, the PRACH occasion may have variable lengths per beam (e.g., 100 microseconds (μs) to 3.2 milliseconds (ms)). Maintaining $t_{id}$ within a system frame can result in too few or too many possible PRACH occasions (possible values of $t_{id}$). Having too few possible PRACH occasions limits flexibility of the PRACH periodicity and density, and having too many also has a negative effect on PRACH periodicity options.

For scheduling delays in NR, uplink scheduling delays are defined as k1, which is the delay between a physical downlink shared channel (PDSCH) and an ACK/NACK uplink transmission, and k2, which is the delay between an uplink grant and a physical uplink shared channel (PUSCH) transmission. Both k1 and k2 are derived from signaled values, and may be referred to herein as dynamic delays. It may be beneficial for all signals from UEs connected to a BS to arrive within the same amount of time. The delays per beam and/or satellite may differ because of variable and different feeder link and service link delays, thereby leading to significantly different arrival times for different signals.

Some techniques and apparatuses described herein provide a BS that is capable of determining and/or utilizing variable uplink response and/or scheduling delays for non-terrestrial networks. For example, the BS may determine a variable RAR window start time, a variable maximum quantity of slots for $t_{id}$, scheduling information related to one or more variable delays for an uplink transmission, and/or the like. This improves communications between a UE and a BS by reducing or eliminating communications issues that can occur as a result of using fixed response and/or scheduling delays. In addition, by improving communications, some techniques and apparatuses described herein conserve processing resources of a UE and/or a BS that would otherwise be consumed as a result of communications issues caused by use of fixed response and/or scheduling delays.

Figure 3:
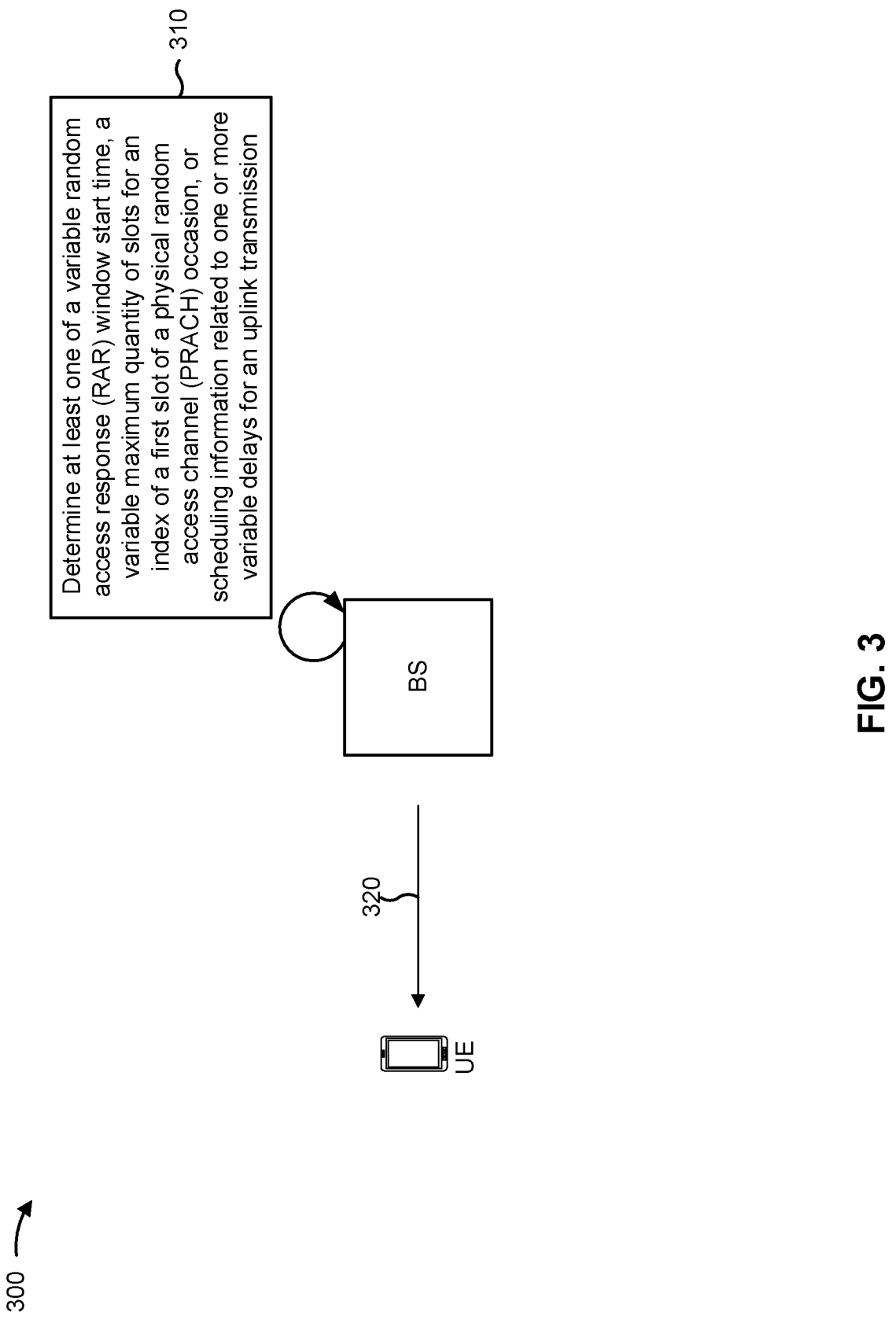
FIGS. 3-5 are diagrams illustrating one or more examples related to variable uplink response and/or scheduling delays for non-terrestrial networks, in accordance with various aspects of the present disclosure.

FIG. 3 is a diagram illustrating an example 300 related to variable uplink response and/or scheduling delays for non-terrestrial networks, in accordance with various aspects of the present disclosure. As shown in FIG. 3, example 300 includes a BS (e.g., BS 110) and a UE (e.g., UE 120). The BS may be associated with a non-terrestrial network and may be a space and/or airborne vehicle (e.g., a satellite, a balloon, an airship, and/or the like).

As shown by reference number 310, the BS may determine at least one of a variable random access response (RAR) window start time, a variable maximum quantity of slots for an index of a first slot of a physical random access channel (PRACH) occasion, or scheduling information related to one or more variable delays for an uplink transmission. For example, the BS may determine the at least one of the variable RAR window start time, the variable maximum quantity of slots for an index of a PRACH occasion (e.g., for $t_{id}$), or the scheduling information in association with connection of the UE to the BS.

The BS may determine the variable RAR window start time for a particular beam, a particular BS, and/or the like. For example, different beams, different BSs, and/or the like may be associated with different variable RAR window start times. The variable RAR window start time may be greater than or equal to (e.g., where the BS is associated with a transparent satellite):

$$2T_{FL}+2T_{SL}+T_B$$

where $T_{FL}$ is a feeder link delay (where the BS determines a maximum value for $T_{FL}$), where $T_{SL}$ is a service link delay, and where $T_B$ is a combination of various other delays, and can vary per beam depending on differential delays and/or doppler. A round-trip or two-way feeder link delay can be determined or approximated by doubling the feeder link delay described above. A round-trip or two-way service link delay can be determined or approximated by doubling the service link delay described above. In some aspects, the variable RAR window start time may be greater than or equal to a linear combination of a feeder link delay, a server link delay, and one or more other delays (e.g., a sum of a first product of two and a feeder link delay, a second product of two and a server link delay, and various other delays). As one example, $T_B$ may be equal to:

$$\tfrac{1}{2}T_{PRACH}+T_{SYMB}+T_{PROC}$$

where $T_{PRACH}$ is a PRACH occasion time, $T_{SYMB}$ is a PRACH symbol time, and $T_{PROC}$ is a BS processing time for a PRACH.

The variable RAR window start time may be greater than or equal to (e.g., where the BS is associated with a regenerative satellite):

$$2T_{SL}+T_B$$

In other words, the variable RAR window start time may be greater than or equal to linear combination of a server link delay, and one or more other delays (e.g., a a sum of a product of two and a service link delay and various other delays).

The BS may determine the variable maximum quantity of slots such that the index of the first slot of the PRACH occasion is between zero and the maximum quantity of slots. The variable maximum quantity of slots may be signaled to the UE or pre-defined. The index may be located within a variable duration of time that the BS signals to the UE or may be pre-configured for the UE. An RA-RNTI may be based at least in part on the maximum quantity of slots. For example, the RA-RNTI may be based at least in part on the following equation:

$$1+S_{id}+14*t_{id}+14*maxquant*f_{id}+\\14*maxquant*8*ul_{carrierid}$$

where maxquant is the maximum quantity of slots. The RA-RNTI may be further based at least in part on an additional beam-dependent parameter, such that the RA-RNTI is based at least in part on the following expression:

$$1+S_{id}+14*t_{id}+14*maxquant*f_{id}+\\14*maxquant*range*b_{id}+\\14*maxquant*range*8*ul_{carrierid}$$

where $b_{id}$ is a beam-dependent parameter that corresponds to a beam, a timing identification method, such as a system frame number, and/or the like and where range is a range for values of $b_{id}$. Alternatively, the RA-RNTI may be based at least in part on the following expression:

$$1+S_{id}+14*t_{id}+14*maxquant*f_{id}+\\14*maxquant*8*ul_{carrierid}+\\14*maxquant*8*range*b_{id}$$

The BS may determine scheduling information that identifies a scheduling delay of one or more variable delays. The scheduling delay may be based at least in part on one or more dynamic scheduling delays (e.g., k1 and k2) and a common scheduling delay that is signaled per beam and/or per cell. For example, the common scheduling delay may be a semi-static scheduling delay that can be configured, for example, using radio resource control (RRC) signaling or another form of semi-static signaling. The common scheduling delay can be broadcasted, or can be signaled to a UE (e.g., as UE-specific signaling). Thus, the common scheduling delay may be signaled a single time, and may apply to a channel type (e.g., PUSCH, PUCCH, and/or the like), whereas a dynamic scheduling delay may be signaled per uplink transmission, and may be included in DCI for the uplink transmission. In this case, a range of the dynamic scheduling delays may be greater than a differential delay. Additionally, or alternatively, the scheduling delay may be UE-specific. In this case, the scheduling delay may be based at least in part on the dynamic scheduling delays. In addition, a sum of the dynamic scheduling delays may be greater than a sum of a differential delay, a feeder link delay, and a service link delay.

Additionally, or alternatively, the scheduling delay may be based at least in part on the dynamic scheduling delays, a common scheduling delay, and a UE-calculated differential delay. The UE-calculated differential delay may be based at least in part on a set of timing advance commands from the BS, ephemeris data and/or a UE's estimation of the UE's location, and/or the like. Ephemeris data includes location information (e.g., current and/or predicted location information), timing information, device health information, and/or the like, and may be transmitted by a GPS satellite for use by a GPS receiver.

Additionally, or alternatively, the scheduling information may identify an uplink slot for the uplink transmission, a system frame number for the uplink transmission, and/or the like. The uplink slot and/or the system frame number may be UE-specific. Additionally, or alternatively, the scheduling information may identify multiple call scheduling delays that are to be used to determine a delay, of the one or more variable delays, from a reference uplink slot and/or a system frame number associated with the UE.

Additionally, or alternatively, the scheduling information may identify a common scheduling delay, of the one or more variable delays, where the common scheduling delay is based at least in part on a round-trip delay (RTD) of a beam center of a beam connected to the BS. Additionally, or alternatively, the scheduling information may identify a common scheduling delay, of the one or more variable delays, where the common scheduling delay is based at least in part on a difference between a round-trip delay of a serving beam and a maximum round-trip delay of a set of beams connected to the BS.

Additionally, or alternatively, the scheduling information may identify a common scheduling delay, of the one or more variable delays, where the common scheduling delay is based at least in part on an offset between downlink slots associated with the BS and uplink slots associated with the UE (e.g., in a frequency division duplex (FDD) context). Additionally, or alternatively, a timing of the uplink transmission may be based at least in part on a common scheduling delay, of the one or more variable delays, where the common scheduling delay is based at least in part on an offset between downlink slots associated with the BS and uplink slots associated with the UE.

As shown by reference number 320, the BS may transmit at least one of information that identifies the RAR window start time, information that identifies the maximum quantity of slots, or the scheduling information. For example, the BS may transmit the at least one of the information that identifies the RAR window start time, the information that identifies the maximum quantity of slots, or the scheduling information to the UE based at least in part on determining this information. The scheduling information, or the other information described above, may be transmitted using radio resource control signaling, medium access control signaling, downlink control information, or a combination thereof. For example, the scheduling information, or a part of the scheduling information, may not necessarily be transmitted using DCI for a particular transmission. The UE and the BS may communicate based at least in part on such information, as described elsewhere herein.

As indicated above, FIG. 3 is provided as an example. Other examples may differ from what is described with respect to FIG. 3.

Figure 4:
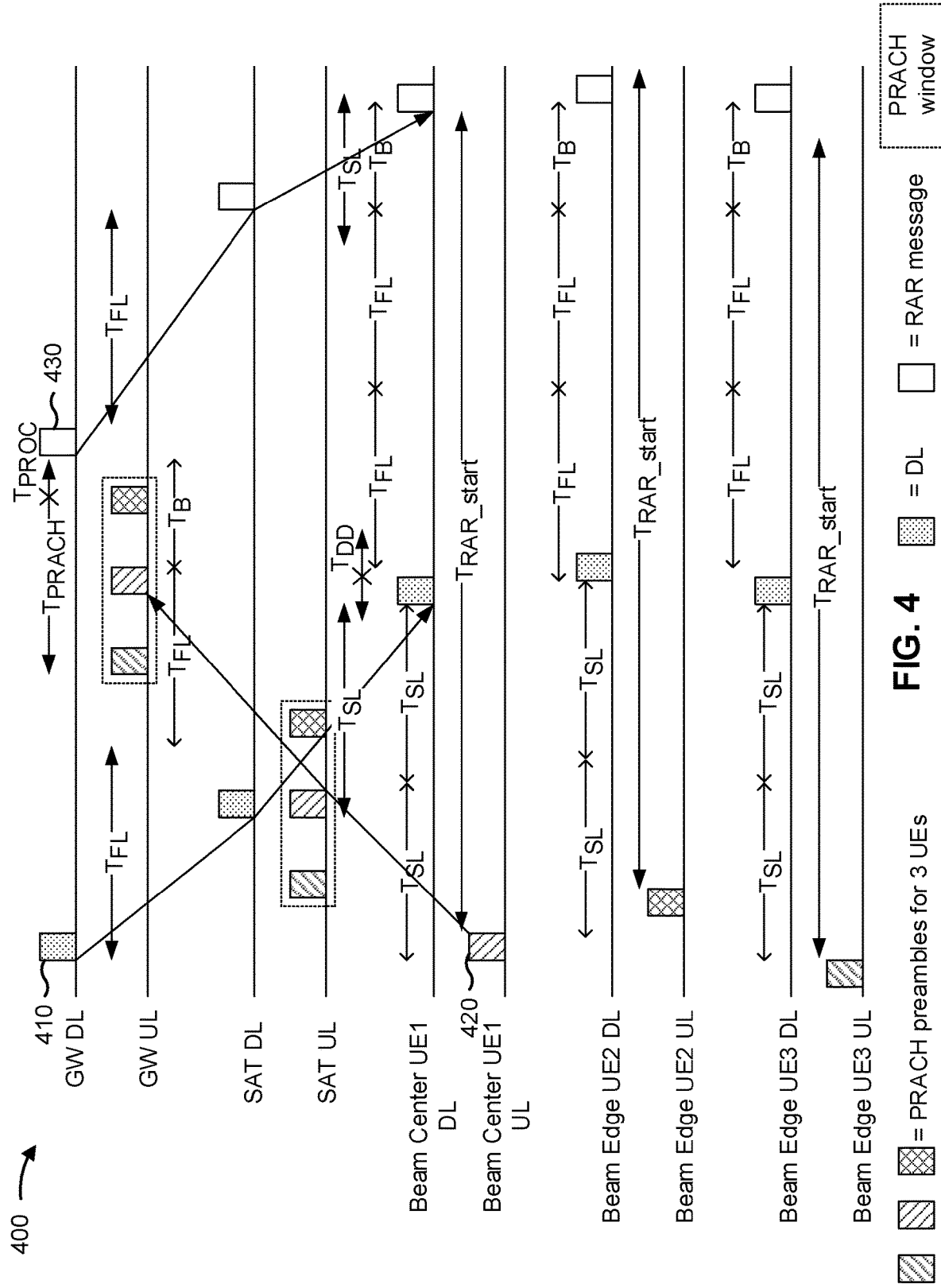

FIG. 4 is a diagram illustrating an example 400 related to variable uplink response and/or scheduling delays for non-terrestrial networks, in accordance with various aspects of the present disclosure. FIG. 4 shows an example related to a RAR window start time where the BS is associated with a transparent satellite.

FIG. 4 shows downlink and uplink transmissions for a gateway ("GW DL" and "GW UL," respectively), downlink and uplink transmissions for a transparent satellite ("SAT DL" and "SAT UL," respectively), and downlink and uplink transmissions for three UEs. One of the UEs may be located at a beam center ("Beam Center UE1 DL" and "Beam Center UE1 UL"), one of the UEs may be located at one edge of a beam ("Beam Edge UE2 DL" and "Beam Edge UE2 UL"), and one UE may be located at another edge of a beam ("Beam Edge UE3 DL" and "Beam Edge UE3 UL").

Reference number 410 shows a downlink transmission that is sent to UE1 from the gateway via the transparent satellite. This downlink transmission may be subject to various delays, including feeder link delay ($T_{FL}$) and service link delay ($T_{SL}$). UE1 may time advance an uplink transmission based at least in part on the service link delay and may transmit a PRACH to the gateway (shown by reference number 420). An RAR window start time ($T_{RAR\_start}$) may begin with transmission of the PRACH shown by reference number 420, and may end with reception of the RAR message from the gateway (shown by reference number 430). As a result, and as described elsewhere herein, the RAR window start time may be greater than or equal to:

$$2T_{FL}+2T_{SL}+T_B$$

As indicated above, FIG. 4 is provided as an example. Other examples may differ from what is described with respect to FIG. 4.

Figure 5:
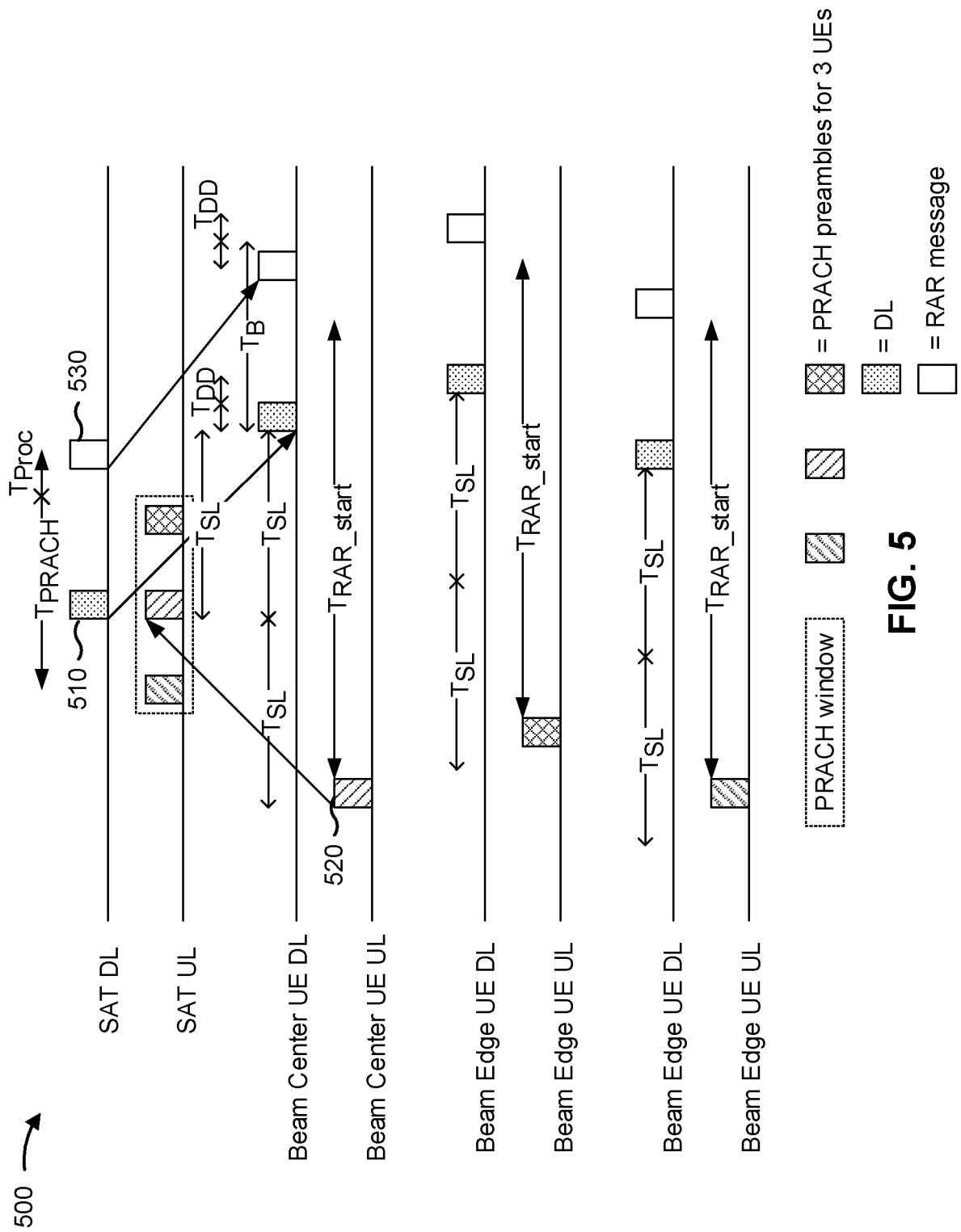

FIG. 5 is a diagram illustrating an example 500 related to variable uplink response and/or scheduling delays for non-terrestrial networks, in accordance with various aspects of the present disclosure. FIG. 5 shows an example related to an RAR window start time where the BS is associated with a regenerative satellite.

FIG. 5 shows downlink and uplink transmissions for a regenerative satellite ("SAT DL" and "SAT UL" respectively) and downlink and uplink transmissions for three UEs. One of the UEs may be located at a beam center ("Beam Center UE1 DL" and "Beam Center UE1 UL"), one of the UEs may be located at one edge of a beam ("Beam Edge UE2 DL" and "Beam Edge UE2 UL"), and one UE may be located at another edge of a beam ("Beam Edge UE3 DL" and "Beam Edge UE3 UL").

Reference number 510 shows a downlink transmission that is sent to UE1 from the regenerative satellite. This downlink transmission may be subject to various delays, including a service link delay ($T_{SL}$). Unlike the downlink transmission described in connection with reference number 410 above, the downlink transmission shown by reference number 510 may not be subject to feeder link delay due to lack of separation between a gateway and the satellite. UE1 may time advance an uplink transmission based at least in part on the service link delay and may transmit a PRACH to the satellite (shown by reference number 520). An RAR window start time ($T_{RAR\_start}$) may begin with transmission of the PRACH shown by reference number 520, and may end with reception of the RAR message from the satellite (shown by reference number 530). The differential delay described elsewhere herein with respect to $T_B$ is shown by "$T_{DD}$". As such, and as described elsewhere herein, the RAR window start time may be greater than or equal to:

$$2T_{SL}+T_B$$

As indicated above, FIG. 5 is provided as an example. Other examples may differ from what is described with respect to FIG. 5.

Figure 6:
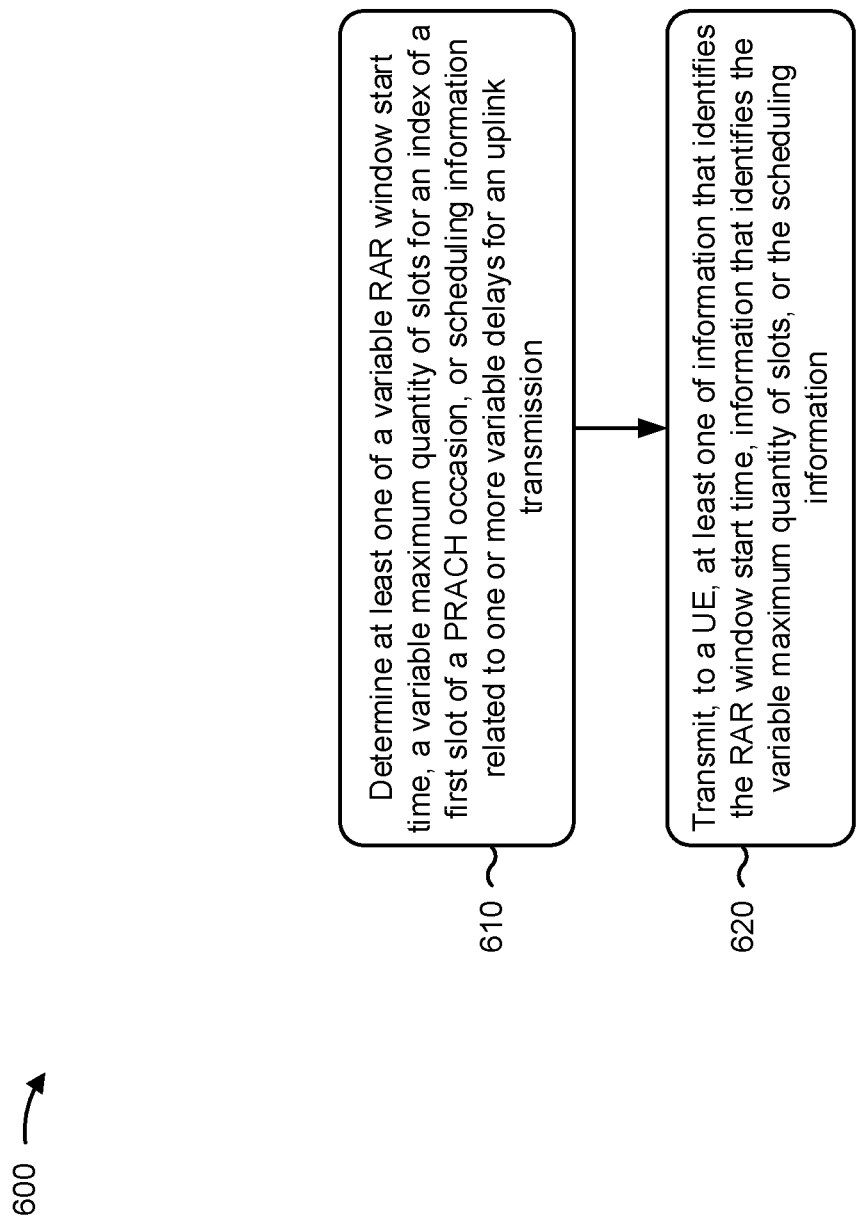
FIG. 6 is a diagram illustrating an example process performed, for example, by a base station, in accordance with various aspects of the present disclosure.

FIG. 6 is a diagram illustrating an example process 600 performed, for example, by a BS, in accordance with various aspects of the present disclosure. Example process 600 is an example where a BS (e.g., BS 110 and/or the like) performs operations associated with variable uplink response and/or scheduling delays for non-terrestrial networks.

As shown in FIG. 6, in some aspects, process 600 may include determining at least one of a variable RAR window start time, a variable maximum quantity of slots for an index of a first slot of a PRACH occasion, or scheduling information related to one or more variable delays for an uplink transmission (block 610). For example, the BS (e.g., using controller/processor 240 and/or the like) may determine at least one of a variable RAR window start time, a variable maximum quantity of slots for an index of a first slot of a PRACH occasion, or scheduling information related to one or more variable delays for an uplink transmission, as described above.

As further shown in FIG. 6, in some aspects, process 600 may include transmitting, to a UE, at least one of information that identifies the RAR window start time, information that identifies the variable maximum quantity of slots, or the scheduling information (block 620). For example, the BS (e.g., using controller/processor 240, transmit processor 220, TX MIMO processor 230, MOD 232, antenna 234, and/or the like) may transmit, to a UE, at least one of information that identifies the RAR window start time, information that identifies the variable maximum quantity of slots, or the scheduling information, as described above.

Process 600 may include additional aspects, such as any single aspect or any combination of aspects described below and/or in connection with one or more other processes described elsewhere herein.

In a first aspect, the variable RAR window start time is associated with at least one of: a particular beam or a particular satellite. In a second aspect, alone or in combination with the first aspect, the variable RAR window start time is greater than or equal to a sum of a first product of two and a feeder link delay, a second product of two and a server link delay, a beam-dependent delay, and a BS processing time.

In a third aspect, alone or in combination with one or more of the first and second aspects, the variable RAR window start time is greater than or equal to a sum of a product of two and a service link delay, a beam-dependent delay, and a BS processing time. In a fourth aspect, alone or in combination with one or more of the first through third aspects, the index of the first slot of the PRACH occasion is between zero and another variable maximum quantity of slots.

In a fifth aspect, alone or in combination with one or more of the first through fourth aspects, the index is located within a variable duration of time that is signaled from the BS or is preconfigured for the UE. In a sixth aspect, alone or in combination with one or more of the first through fifth aspects, a random access radio network temporary identifier (RA-RNTI) is based at least in part on the variable maximum quantity of slots.

In a seventh aspect, alone or in combination with one or more of the first through sixth aspects, an RA-RNTI is further based at least in part on an additional beam-dependent parameter. In an eighth aspect, alone or in combination with one or more of the first through seventh aspects, the additional beam-dependent parameter corresponds to a beam or a timing identification method.

In a ninth aspect, alone or in combination with one or more of the first through eighth aspects, the scheduling information identifies a scheduling delay, of the one or more variable delays, that is based at least in part on one or more dynamic scheduling delays and a common scheduling delay, wherein a range of the one or more dynamic scheduling delays is greater than a differential delay. In a tenth aspect, alone or in combination with one or more of the first through ninth aspects, the scheduling information identifies a scheduling delay, of the one or more variable delays, that is UE-specific and that is based at least in part on multiple call scheduling delays, wherein a sum of the multiple call scheduling delays is greater than a sum of a differential delay, a feeder link delay, and a service link delay.

In an eleventh aspect, alone or in combination with one or more of the first through tenth aspects, the scheduling information identifies a scheduling delay, of the one or more variable delays, that is based at least in part on multiple call scheduling delays, a common scheduling delay, and a UE-calculated differential delay. In a twelfth aspect, alone or in combination with one or more of the first through eleventh aspects, the scheduling information identifies an uplink slot for the uplink transmission and a system frame number for the uplink transmission.

In a thirteenth aspect, alone or in combination with one or more of the first through twelfth aspects, the uplink slot and the system frame number are UE-specific. In a fourteenth aspect, alone or in combination with one or more of the first through thirteenth aspects, the scheduling information identifies multiple call scheduling delays that are to be used to determine a delay, of the one or more variable delays, from a reference uplink slot or a system frame number associated with the UE.

In a fifteenth aspect, alone or in combination with one or more of the first through fourteenth aspects, the scheduling information identifies a common scheduling delay of the one or more variable delays, wherein the common scheduling delay is based at least in part on a round-trip delay of a beam center of a beam connected to the BS. In a sixteenth aspect, alone or in combination with one or more of the first through fifteenth aspects, the scheduling information identifies a common scheduling delay of the one or more variable delays, wherein the common scheduling delay is based at least in part on a difference between a round-trip delay of a serving beam and a maximum round-trip delay of a set of beams connected to the BS.

In a seventeenth aspect, alone or in combination with one or more of the first through sixteenth aspects, a timing of the uplink transmission is based at least in part on a common scheduling delay of the one or more variable delays, wherein the common scheduling delay is based at least in part on a maximum round-trip delay of round-trip delays for a set of beams connected to the BS. In an eighteenth aspect, alone or in combination with one or more of the first through seventeenth aspects, the scheduling information identifies a common scheduling delay of the one or more variable delays, wherein the common scheduling delay is based at least in part on an offset between downlink slots associated with the BS and uplink slots associated with the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
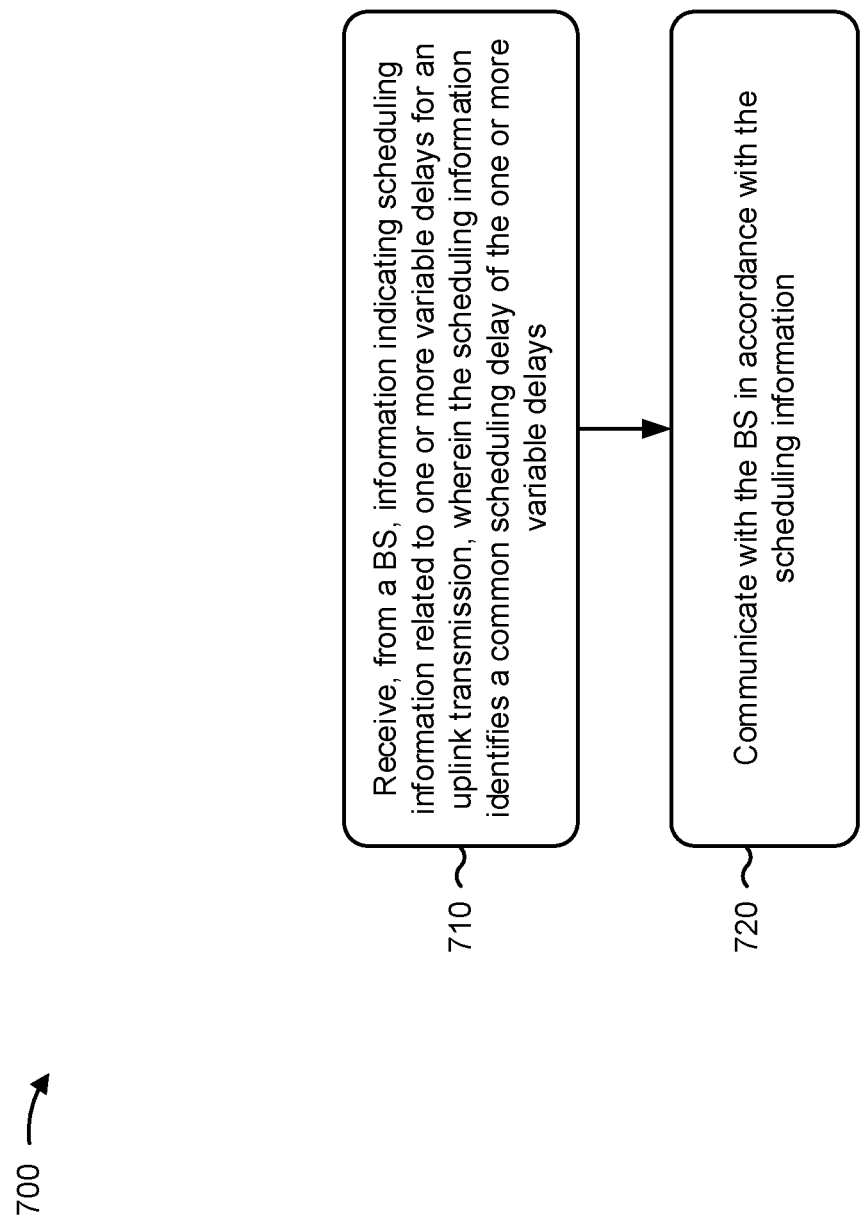
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with variable uplink response and/or scheduling delays for non-terrestrial networks.

As shown in FIG. 7, in some aspects, process 700 may include receiving, from a BS, information indicating scheduling information related to one or more variable delays for an uplink transmission, wherein the scheduling information identifies a common scheduling delay of the one or more variable delays (block 710). For example, the UE (e.g., using antenna 252, DEMOD 254, MIMO detector 256, receive processor 258, controller/processor 280, and/or the like) may receive, from a BS, information indicating scheduling information related to one or more variable delays for an uplink transmission, as described above. In some aspects, the scheduling information identifies a common scheduling delay of the one or more variable delays.

As further shown in FIG. 7, in some aspects, process 700 may include communicating with the BS in accordance with the scheduling information (block 720). For example, the UE (e.g., using controller/processor 280, transmit processor 264, TX MIMO processor 266, MOD 254, antenna 252, and/or the like) may communicate with the BS in accordance with the scheduling information, as described above.

Process 700 may include additional aspects, such as any single aspect or any combination of aspects described below and/or in connection with one or more other processes described elsewhere herein.

In a first aspect, the scheduling information identifies a scheduling delay, of the one or more variable delays, that is based at least in part on the common scheduling delay and a dynamic scheduling delay, and a range of the dynamic scheduling delay is greater than a differential delay.

In a second aspect, alone or in combination with the first aspect, the common scheduling delay is signaled per cell or per beam.

In a third aspect, alone or in combination with one or more of the first and second aspects, the common scheduling delay is signaled on a per-UE basis.

In a fourth aspect, alone or in combination with one or more of the first through third aspects, the scheduling information identifies a scheduling delay, of the one or more variable delays, that is UE-specific and that is based at least in part on one or more dynamic scheduling delays, and the one or more dynamic scheduling delays are collectively greater than a sum of a differential delay, a feeder link delay, and a service link delay.

In a fifth aspect, alone or in combination with one or more of the first through fourth aspects, the scheduling information identifies a scheduling delay, of the one or more variable delays, that is based at least in part on one or more dynamic scheduling delays, the common scheduling delay, and a UE-calculated differential delay.

In a sixth aspect, alone or in combination with one or more of the first through fifth aspects, the scheduling information identifies an uplink slot for the uplink transmission and a system frame number for the uplink transmission, and the uplink slot and the system frame number are UE-specific.

In a seventh aspect, alone or in combination with one or more of the first through sixth aspects, the scheduling information identifies one or more dynamic scheduling delays that are to be used to determine a delay, of the one or more variable delays, from a reference uplink slot or a system frame number associated with the UE.

In an eighth aspect, alone or in combination with one or more of the first through seventh aspects, the common scheduling delay is based at least in part on a round-trip delay of a beam center of a beam connected to the BS.

In a ninth aspect, alone or in combination with one or more of the first through eighth aspects, the common scheduling delay is based at least in part on a difference between a round-trip delay of a serving beam of a UE and a maximum round-trip delay of a set of beams connected to the BS.

In a tenth aspect, alone or in combination with one or more of the first through ninth aspects, the common scheduling delay is based at least in part on a maximum round-trip delay of round-trip delays for a set of beams connected to the BS.

In an eleventh aspect, alone or in combination with one or more of the first through tenth aspects, the common scheduling delay is based at least in part on an offset between downlink slots associated with the BS and uplink slots associated with the UE.

In a twelfth aspect, alone or in combination with one or more of the first through eleventh aspects, process 700 includes receiving information that identifies a variable random access response (RAR) window start time; and performing, prior to communicating with the BS in accordance with the scheduling information, a random access procedure in accordance with the information that identifies the variable RAR window start time.

In a thirteenth aspect, alone or in combination with one or more of the first through twelfth aspects, the variable RAR window start time is associated with at least one of: a particular beam, or a particular satellite.

In a fourteenth aspect, alone or in combination with one or more of the first through thirteenth aspects, the variable RAR window start time is greater than or equal to a value determined based at least in part on a combination of a two-way feeder link delay, a two-way server link delay, a beam-dependent delay, and a BS processing time.

In a fifteenth aspect, alone or in combination with one or more of the first through fourteenth aspects, the variable RAR window start time is greater than or equal to a value determined based at least in part on a two-way service link delay, a beam-dependent delay, and a BS processing time.

In a sixteenth aspect, alone or in combination with one or more of the first through fifteenth aspects, process 700 includes receiving information that identifies a variable maximum quantity of slots for an index of a first slot of a physical random access channel (PRACH) occasion; and performing, prior to communicating with the BS in accordance with the scheduling information, a random access procedure in accordance with the variable maximum quantity of slots for the index of the first slot of the PRACH occasion.

In a seventeenth aspect, alone or in combination with one or more of the first through sixteenth aspects, the index of the first slot of the PRACH occasion is between zero and another variable maximum quantity of slots.

In an eighteenth aspect, alone or in combination with one or more of the first through seventeenth aspects, the index is located within a variable duration of time that is signaled from the BS or is preconfigured for the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
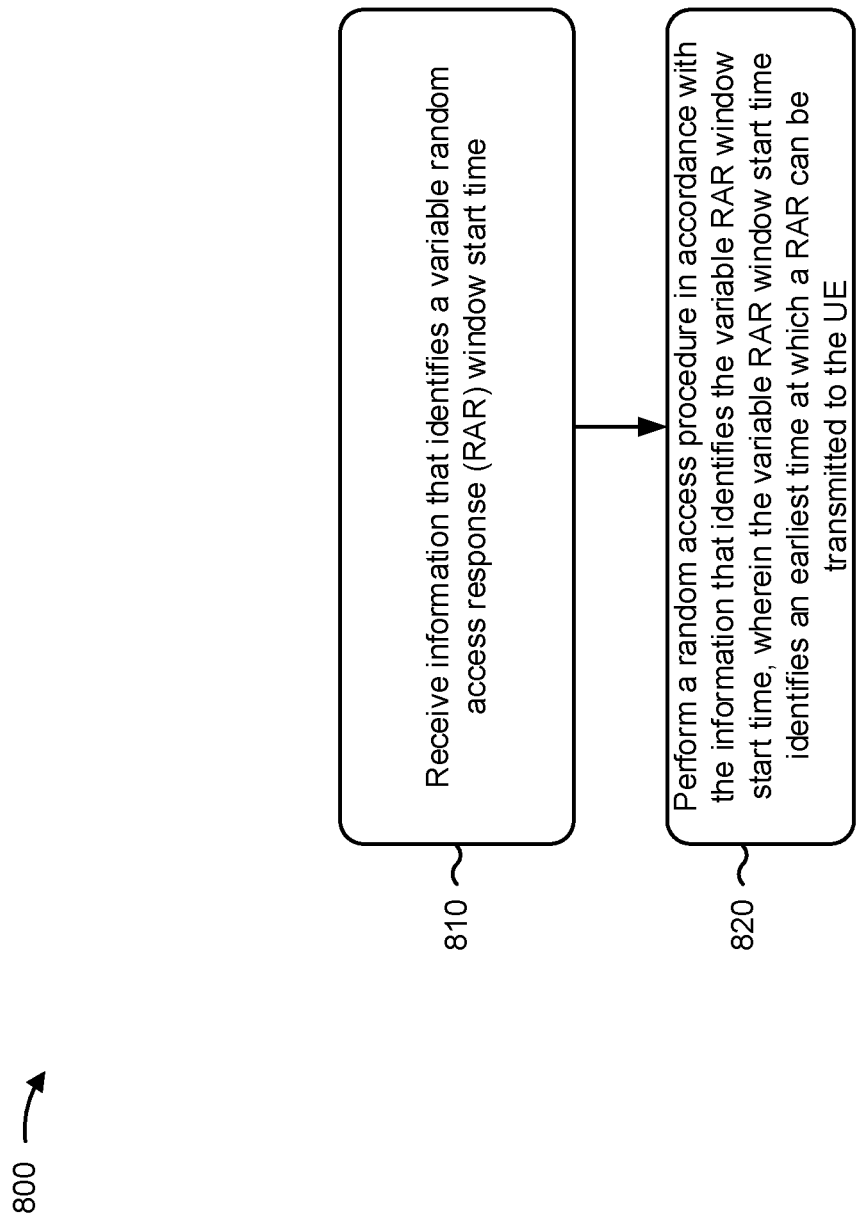
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure.

Example process 800 is an example where the UE (e.g., UE 120 and/or the like) performs operations associated with variable uplink response and/or scheduling delays for non-terrestrial networks.

As shown in FIG. 8, in some aspects, process 800 may include receiving information that identifies a variable random access response (RAR) window start time (block 810). For example, the UE (e.g., using antenna 252, DEMOD 254, MIMO detector 256, receive processor 258, controller/processor 280, and/or the like) may receive information that identifies a variable random access response (RAR) window start time, as described above. In some aspects, the scheduling information identifies a common scheduling delay of the one or more variable delays.

As further shown in FIG. 8, in some aspects, process 800 may include performing a random access procedure in accordance with the information that identifies the variable RAR window start time, wherein the variable RAR window start time identifies an earliest time at which a RAR can be transmitted to the UE (block 820). For example, the UE (e.g., using controller/processor 280, transmit processor 264, TX MIMO processor 266, MOD 254, antenna 252, and/or the like) may performing a random access procedure in accordance with the information that identifies the variable RAR window start time, as described above. In some aspects, the variable RAR window start time identifies an earliest time at which a RAR can be transmitted to the UE, as described above.

Process 800 may include additional aspects, such as any single aspect or any combination of aspects described below and/or in connection with one or more other processes described elsewhere herein.

In a first aspect, the variable RAR window start time is associated with at least one of a particular beam, or a particular satellite.

In a second aspect, alone or in combination with the first aspect, the variable RAR window start time is greater than or equal to a value determined based at least in part on a combination of a two-way feeder link delay, a two-way server link delay, a beam-dependent delay, and a BS processing time.

In a third aspect, alone or in combination with the first aspect and/or the second aspect, process 800 includes receiving information that identifies a variable maximum quantity of slots for an index of a first slot of a physical random access channel (PRACH) occasion, wherein the random access procedure is performed in accordance with the variable maximum quantity of slots for the index of the first slot of the PRACH occasion.

In a fourth aspect, alone or in combination with one or more of the first through third aspects, the index of the first slot of the PRACH occasion is between zero and another variable maximum quantity of slots.

In a fifth aspect, alone or in combination with one or more of the first through fourth aspects, the index is located within a variable duration of time that is signaled from the BS or is preconfigured for the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station (BS), information indicating scheduling information related to one or more variable delays for an uplink transmission, wherein the scheduling information identifies a scheduling delay of the one or more variable delays, and wherein the scheduling delay is based at least in part on a common scheduling delay and a dynamic scheduling delay,
   wherein the dynamic scheduling delay corresponds to:
      a delay between a physical downlink shared channel (PDSCH) and an acknowledgment/negative acknowledgment (ACK/NACK) uplink transmission, or
      a delay between an uplink grant and a physical uplink shared channel (PUSCH) transmission; and
   communicating with the BS in accordance with the scheduling information.

2. The method of claim 1, wherein the common scheduling delay is signaled per cell or per beam.

3. The method of claim 1, wherein the common scheduling delay applies to all uplink transmissions of a channel type, and wherein the dynamic scheduling delay is specific to a transmission of the channel type.

4. The method of claim 1, wherein the common scheduling delay is signaled on a per-UE basis.

5. The method of claim 1, wherein the common scheduling delay is broadcasted.

6. The method of claim 1, wherein the scheduling information identifies one or more dynamic scheduling delays that are to be used to determine a delay, of the one or more variable delays, from a reference uplink slot or a system frame number associated with the UE.

7. The method of claim 1, wherein the scheduling delay is based at least in part on a round-trip delay of a beam center of a beam connected to the BS.

8. The method of claim 1, wherein the scheduling delay is based at least in part on a difference between a round-trip delay of a serving beam of a UE and a maximum round-trip delay of a set of beams connected to the BS.

9. The method of claim 1, wherein the scheduling delay is based at least in part on a maximum round-trip delay of round-trip delays for a set of beams connected to the BS.

10. The method of claim 1, wherein the scheduling delay is based at least in part on an offset between downlink slots associated with the BS and uplink slots associated with the UE.

11. A user equipment (UE) for wireless communication, comprising:
a memory; and
one or more processors coupled to the memory, the one or more processors configured to:
receive, from a base station (BS), information indicating scheduling information related to one or more variable delays for an uplink transmission, wherein the scheduling information identifies a scheduling delay of the one or more variable delays, and wherein the scheduling delay is based at least in part on a common scheduling delay and a dynamic scheduling delay,
wherein the dynamic scheduling delay corresponds to:
a delay between a physical downlink shared channel (PDSCH) and an acknowledgment/negative acknowledgment (ACK/NACK) uplink transmission, or
a delay between an uplink grant and a physical uplink shared channel (PUSCH) transmission; and
communicate with the BS in accordance with the scheduling information.

12. The UE of claim 11, wherein the common scheduling delay is signaled on a per-UE basis.

13. The UE of claim 11, wherein the common scheduling delay is signaled per cell or per beam.

14. The UE of claim 11, wherein the scheduling delay applies to all uplink transmissions of a channel type, and wherein the one or more variable delays are specific to a transmission of the channel type.

15. The UE of claim 11, wherein the scheduling information identifies one or more dynamic scheduling delays that are to be used to determine a delay, of the one or more variable delays, from a reference uplink slot or a system frame number associated with the UE.

16. The UE of claim 11, wherein the scheduling delay is based at least in part on a round-trip delay of a beam center of a beam connected to the BS.

17. The UE of claim 11, wherein the scheduling delay is based at least in part on a difference between a round-trip delay of a serving beam of a UE and a maximum round-trip delay of a set of beams connected to the BS.

18. The UE of claim 11, wherein the scheduling delay is based at least in part on a maximum round-trip delay of round-trip delays for a set of beams connected to the BS.

19. The UE of claim 11, wherein the scheduling delay is based at least in part on an offset between downlink slots associated with the BS and uplink slots associated with the UE.

20. A non-transitory computer-readable medium storing a set of instructions for wireless communication, the set of instructions comprising:
one or more instructions that, when executed by one or more processors of a user equipment (UE), cause the UE to:
receive, from a base station (BS), information indicating scheduling information related to one or more variable delays for an uplink transmission, wherein the scheduling information identifies a scheduling delay of the one or more variable delays, and wherein the scheduling delay is based at least in part on a common scheduling delay and a dynamic scheduling delay,
wherein the dynamic scheduling delay corresponds to:
a delay between a physical downlink shared channel (PDSCH) and an acknowledgment/negative acknowledgment (ACK/NACK) uplink transmission, or
a delay between an uplink grant and a physical uplink shared channel (PUSCH) transmission; and
communicate with the BS in accordance with the scheduling information.

21. The non-transitory computer-readable medium of claim 20, wherein the common scheduling delay is signaled on a per-UE basis.

22. The non-transitory computer-readable medium of claim 20, wherein the scheduling delay applies to all uplink transmissions of a channel type, and wherein the one or more variable delays are specific to a transmission of the channel type.

23. The non-transitory computer-readable medium of claim 20, wherein the common scheduling delay applies to all uplink transmissions of a channel type, and wherein the dynamic scheduling delay is specific to a transmission of the channel type.

24. The non-transitory computer-readable medium of claim 20, wherein the common scheduling delay is signaled on a per-UE basis.

25. The non-transitory computer-readable medium of claim 20, wherein the common scheduling delay is broadcasted.

26. The non-transitory computer-readable medium of claim 20, wherein the scheduling information identifies one or more dynamic scheduling delays that are to be used to determine a delay, of the one or more variable delays, from a reference uplink slot or a system frame number associated with the UE.

27. The non-transitory computer-readable medium of claim 20, wherein the scheduling delay is based at least in part on a round-trip delay of a beam center of a beam connected to the BS.

28. The non-transitory computer-readable medium of claim 20, wherein the scheduling delay is based at least in part on a difference between a round-trip delay of a serving beam of a UE and a maximum round-trip delay of a set of beams connected to the BS.

29. The non-transitory computer-readable medium of claim 20, wherein the scheduling delay is based at least in part on a maximum round-trip delay of round-trip delays for a set of beams connected to the BS.

30. The non-transitory computer-readable medium of claim 20, wherein the scheduling delay is based at least in part on an offset between downlink slots associated with the BS.

31. The non-transitory computer-readable medium of claim 20, wherein the scheduling delay is based at least in part on an offset between downlink slots associated with the BS and uplink slots associated with the UE.

32. An apparatus for wireless communication, comprising:
means for receiving, from a base station (BS), information indicating scheduling information related to one or more variable delays for an uplink transmission, wherein the scheduling information identifies a scheduling delay of the one or more variable delays, and wherein the scheduling delay is based at least in part on a common scheduling delay and a dynamic scheduling delay,
    wherein the dynamic scheduling delay corresponds to:
        a delay between a physical downlink shared channel (PDSCH) and an acknowledgment/negative acknowledgment (ACK/NACK) uplink transmission, or
        a delay between an uplink grant and a physical uplink shared channel (PUSCH) transmission; and
    means for communicating with the BS in accordance with the scheduling information.

33. The apparatus of claim 32, wherein the common scheduling delay is signaled on a per-device basis.

34. The apparatus of claim 32, wherein the common scheduling delay is signaled per cell or per beam.

35. The apparatus of claim 32, wherein the scheduling delay applies to all uplink transmissions of a channel type, and wherein the one or more variable delays are specific to a transmission of the channel type.

36. The apparatus of claim 32, wherein the common scheduling delay applies to all uplink transmissions of a channel type, and wherein the dynamic scheduling delay is specific to a transmission of the channel type.

37. The apparatus of claim 32, wherein the common scheduling delay is signaled on a per-apparatus basis.

38. The apparatus of claim 32, wherein the common scheduling delay is broadcasted.

39. The apparatus of claim 32, wherein the scheduling information identifies one or more dynamic scheduling delays that are to be used to determine a delay, of the one or more variable delays, from a reference uplink slot or a system frame number associated with the apparatus.

40. The apparatus of claim 32, wherein the scheduling delay is based at least in part on a round-trip delay of a beam center of a beam connected to the BS.

41. The apparatus of claim 32, wherein the scheduling delay is based at least in part on a difference between a round-trip delay of a serving beam of a user equipment and a maximum round-trip delay of the set of beams connected to the BS.

42. The apparatus of claim 32, wherein the scheduling delay is based at least in part on an offset between downlink slots associated with the BS.

43. The apparatus of claim 32, wherein the scheduling delay is based at least in part on an offset between downlink slots associated with the BS and uplink slots associated with the apparatus.

44. The apparatus of claim 32, wherein the scheduling delay is based at least in part on a maximum round-trip delay of round-trip delays for a set of beams connected to the BS.

* * * * *